July 11, 1933.                    L. MARZOCCHI                    1,918,118
              AUTOMATIC MACHINE FOR FILLING AND SEALING
                 AMPULES, PHIALS, AND THE LIKE VESSELS
                      Filed Jan. 10, 1930        4 Sheets-Sheet 1
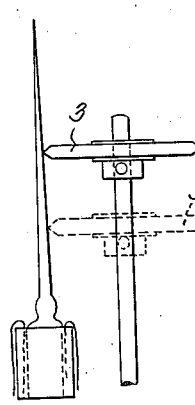
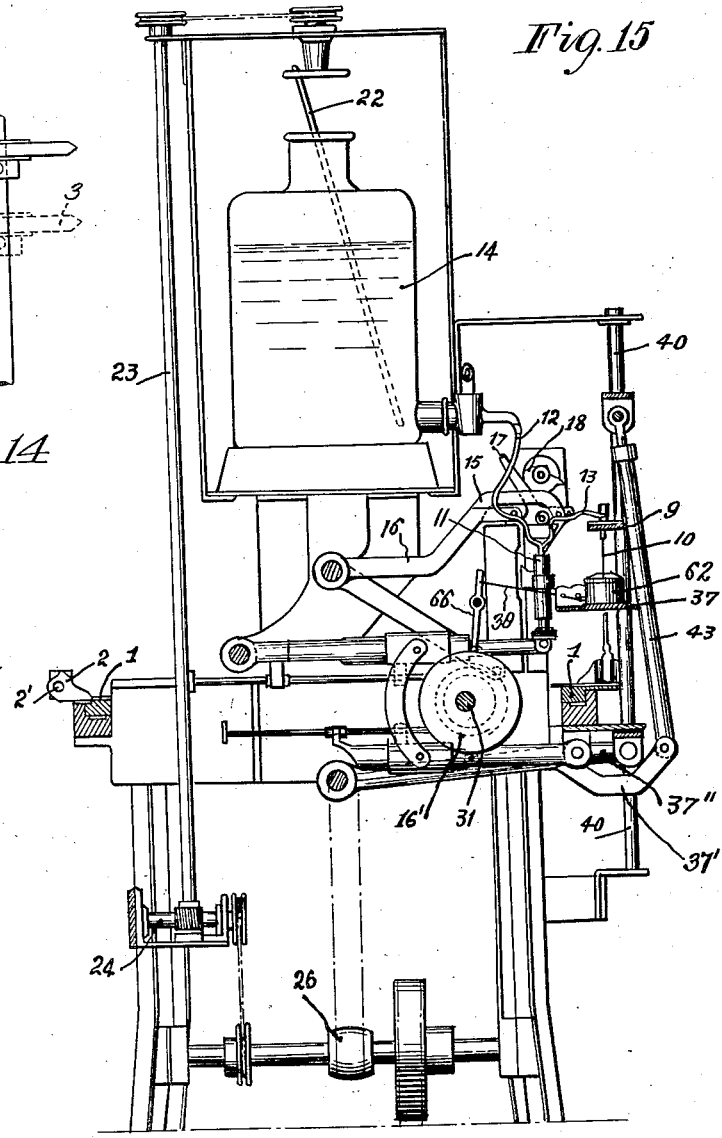
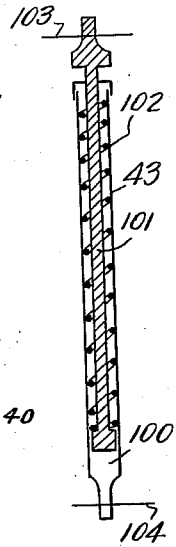
Inventor
Luigi Marzocchi
by Wilkinson & Mawhinney
Attorneys

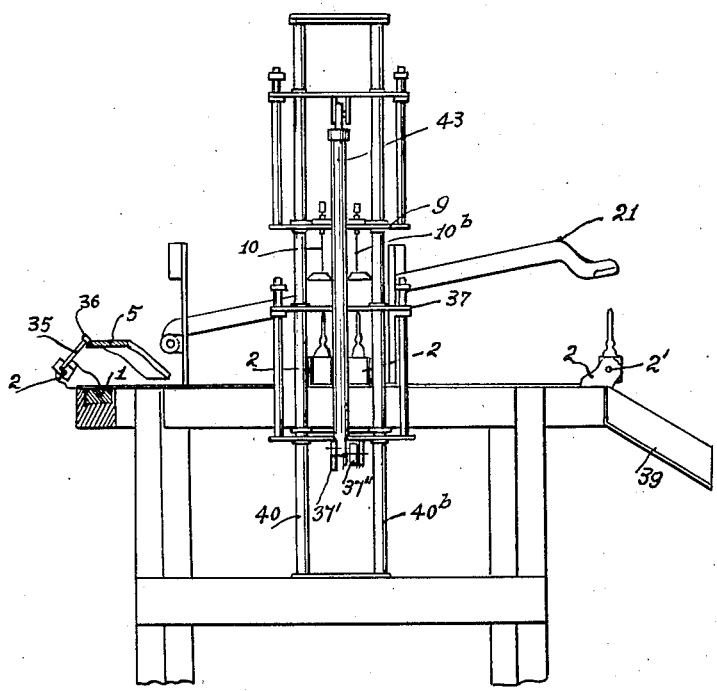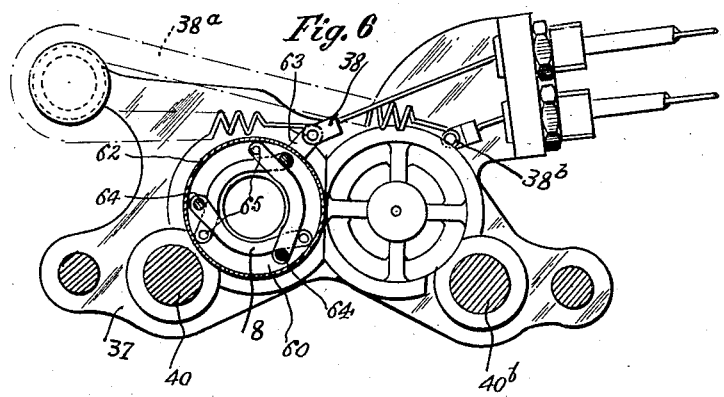

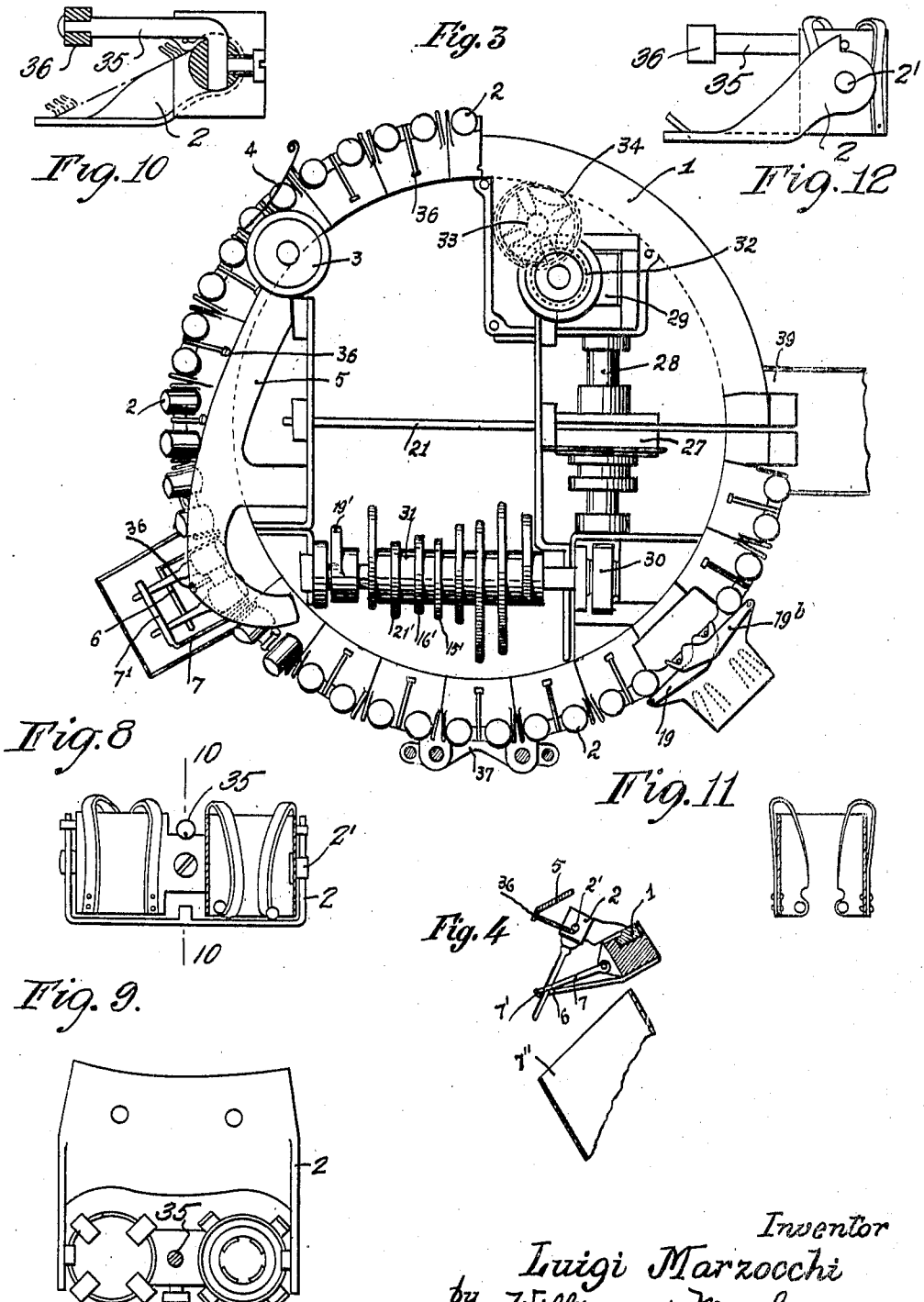

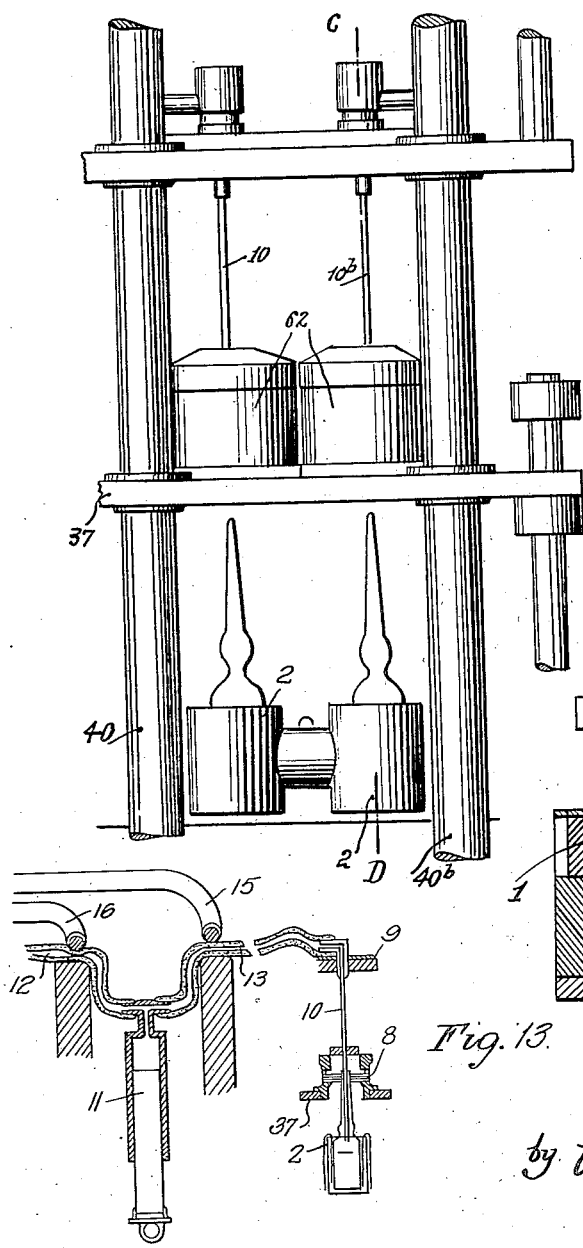
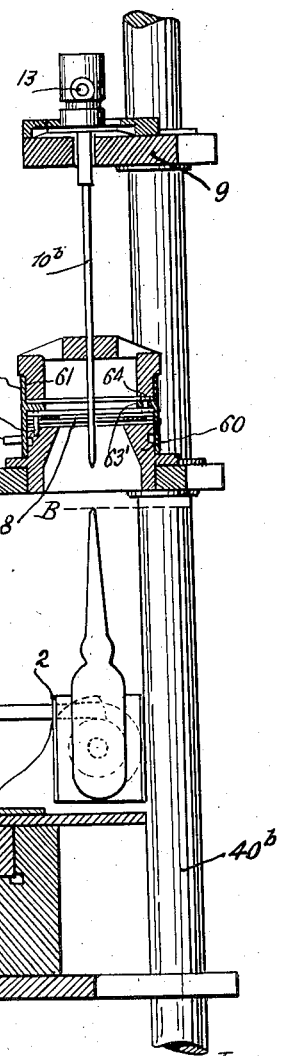

Patented July 11, 1933

1,918,118

UNITED STATES PATENT OFFICE

LUIGI MARZOCCHI, OF MILAN, ITALY

AUTOMATIC MACHINE FOR FILLING AND SEALING AMPULES, PHIALS, AND THE LIKE VESSELS

Application filed January 10, 1930, Serial No. 419,939, and in Italy January 23, 1929.

This invention is concerned with the filling and sealing of ampules, phials and the like vessels such as are generally employed in the sale of chemical and pharmaceutical products, injection preparations and so forth. Its principal object is to provide a simple yet reliable automatic machine for the purpose stated.

Further objects of the invention are concerned with specific precautions and improvements in the various operations of trimming the ampul neck, filling the ampul with a measured quantity of material, sealing off the ampule and delivering it from the machine.

One such object is to ensure the neck of each rough ampul introduced into the machine being cut down to an exactly predeterminable length and, moreover, to preclude any danger of fragments of glass entering the ampul.

A further object of the invention is the provision of a suitable ampul holder which shall be capable of being moved to positions appropriate to the operations to be performed, shall be adapted for holding ampules of various dimensions and shall allow of slight movement of the ampul for centering purposes.

The invention also envisages automatically operated centering mechanism at the filling and sealing stations of the machine, such mechanism being intended to bring the necks of even malformed or defective ampules into correct position for the operations mentioned. Another object in view is the provision of simple pump devices and valve gear adapted, in particular, to prevent wetting of the ampul neck at the end of the filling operation. Yet a further object is to prevent damage to the filling nozzles should they encounter any obstacle in their movement towards the ampules.

These and other objects will now be explained by reference to the accompanying drawings:—

Figure 1 is a side elevation of the machine, partially in section,

Figure 2 is a front elevation,

Figure 3 a plan,

Figure 4 a detail view of the hammer device,

Figure 5 a front elevation to a larger scale of an automatic centering device,

Figure 6 a plan view of said automatic centering device, partially in section,

Figure 7 a part vertical section on the line 7—7 of Figure 5,

Figure 8 is a front elevation of a pair of ampul holders with parts broken away.

Figure 9 is a plan view of the same with parts in section.

Figure 10 is a central vertical section along the line 10—10 of Figure 8.

Figure 11 is a central vertical section through a single ampul holder.

Figure 12 is a side elevation of the parts shown in Figure 8.

Figure 13 is an enlarged section of an ampul filling device including the plunger, Figure 14 is an enlarged detail view showing the mode of adjusting the cutting device, and Figure 15 is a central vertical section through the telescopic link member.

Referring to the accompanying drawings, the simple but reliable machine illustrated comprises in essentials a rotatable ring shaped carrier 1 supporting at its outer periphery a plurality of ampul holders 2 which are carried by the rotation of the ring 1 past a series of stations at which the various necessary operations are performed upon the ampules. As shown two ampules are treated at a time at each station. At the first of said stations there is a scoring or cutting device 3 which may be sector shaped or disc shaped as illustrated and has an edge adapted to exert a scoring or cutting action; a suitably shaped support such as a spring strip 4 or the like acts upon the ampules during the cutting or scoring. A fixed sector 5 furnished with a cam surface, the purpose of which will be explained hereinafter, precedes the next station where the excess length of ampul neck is removed by a hammer device comprising a fixed support 6 and a cam controlled rock arm 7 carrying a hammer member 7' (Figures 3 and 4). The following station at which the ampules are filled includes an automatic centering arrangement 8, a yoke 9 for supporting hollow filling needles 10, 10ᵇ mounted therein, a plunger operated syringe device 11 and connecting tubes 12, 13 serving respectively for drawing in liquid from a vessel 14 and for supplying this liquid to the upper parts of the filling needles 10, 10ᵇ.

The valve arrangement for these tube connections comprises two levers 15, 16 controlled by corresponding disc cams 15′ 16′ and terminating in pins adapted to bear upon and constrict the connecting tubes 12, 13. Said valve arrangement also includes a double armed lever 17 which is controlled by a cam 18 and, when required, holds up the lever 16 while bearing by a pin at its other end upon the pipe 13.

At the next station where the ampules are sealed off by being fused up the ampul necks are automatically centered by means consisting of two lever arms 19, 19ᵇ provided with oblique faces and controlled from a cam 19′ with the aid of a flexible cable not shown in the drawings. One or more pipes 20 serve to supply gas and compressed air for the fine pointed flame of a blow-lamp or the like.

At the last station there is an ejector lever 21 controlled by a cam 21′.

A stirring or agitating device 22 in the vessel 14 is operated from a shaft 23 driven from a motor (not shown) through transmission gear 24 and a counter shaft 26. A shaft 28 with a friction device 27 drives a cam shaft 31 through a worm 30 and, through a worm 29 and gear wheel 32, a Maltese cross gear 33 which engages with a toothed annular rack 34 on the ring 1.

The ampules, phials or the like glass vessels still possessing the long necks with which they are generally received from the glass factory, are inserted in the ampul supports or holders 2 with the necks directed upwardly. These supports or holders are provided with spring gripping or holding means enabling vessels of different sizes to be accommodated and allowing also of slight centering movement.

Since the cam shaft 31 is driven directly from the shaft 28 whereas the ring 1 carrying the ampul holders is driven through the Maltese cross 33, it is obvious that although said cam-shaft 31 will rotate continuously during the working of the machine, the ring 1 will only execute a movement after a three quarters rotation of the cam shaft. Consequently the ring carrier 1 is displaced the requisite amount during one quarter rotation of the cam shaft and then remains stationary for the three remaining quarters rotation thereof.

The ampules inserted in the holders are, therefore, moved forward in their holders at intermittent intervals. Assuming that the rotation is in the direction of the arrow A in Figure 3 of the drawings, the throat of each ampul in turn is first brought by said rotation between the spring 4 and the cutter disc 3, whereby a slit, incision or score is produced upon the neck always at a predetermined point which, however, may be adjusted as for instance by vertical adjustment of the cutter disc 3.

Each ampul holder 2 is rotatable about a horizontal axis 2′ and is controlled by an arm 35 provided with a follower bowl 36 adapted, when it encounters the suitably shaped or designed cam sector 5, to cause the ampul holder 2 to assume an inverted position (Figure 4) so that the ampul or phial is held with its long neck inclined downwardly. The motion of the ring 1, that is the feed motion of the holders 2, is made such that one or more holders are brought by each such motion into the position previously occupied by the preceding one or more holders.

The cam 5 remains stationary while the phial carriers complete their movement integral with ring 1. The cam 5 is provided so that the arms 35 of the phial carriers with the follower rollers 36 bear against the cam during their movement with the ring 1. The phial carriers are gradually rotated about their horizontal axes so that in the maximum inclined position of the phial carriers they present the phials to be sealed in an inverted position, that is, with necks down against the support 6 and under the hammer 7′. In this inverted position, the severing of the excess material in the neck is done and the desired length obtained.

The cutting is produced by the movement of a lever 7, which brings the hammer 7′ to bear gradually against the neck of the phial to be cut. Thus, the neck itself bears against the fixed support 6 at the point at which it has previously been cut, whereupon severing of the excess length is accomplished, and as shown in Figure 3, the ring progressing into the direction indicated by arrow A, the arms 35 and rollers 36 pass from contact with the cam 5 and under action of the spring 50, one of which is associated with each carrier, the carriers and the phials therein are returned to their initial position for the remainder of the operations.

At the moment of maximum downward inclination of the ampul necks the ampul holders bring the necks of the inverted ampules to bear upon the support 6; thereupon the lever arm 7 carrying the hammer like member 7′, actuated through suitable transmission gear from a cam mounted on the shaft 31, descends and strikes the neck precisely at the point at which it has been previously cut by the cutter disc 3, after which said hammer returns to its position of rest. This operation is naturally performed during the three quarters rotation of the cams during which the ring 1 carrying the ampul holders is stationary.

It will be appreciated that the neck portion of the ampul or phial to be removed is always cut off at the same level because the cutter disc 3 does not vary its position and always cuts the neck at a definite point. This operation of cutting off the excess length of ampul neck is always effected, moreover, while the ampul neck is directed downwardly which is of great importance because it prevents the possibility of splinters of glass, even if microscopically small, falling into the interior of the ampul during the removal of said neck portion. The glass removed falls into a chute 7".

In the phase of movement next commenced the ampul holder or support is brought into its original vertical position with the ampul neck directed upwardly by the action of the appropriately shaped cam sector 5 and a spring 50 which acts to return the ampul holder to its initial position, i. e. with the ampul vertical; the holder then continues its movement until it comes within the reach of the automatic centering and filling devices illustrated more particularly in Figures 5, 6 and 7 wherein they are shown to a larger scale.

The automatic centering device mounted on the yoke 37 is moved up and down on the guide-rods 40, 40ᵇ by a lever 37" (Figure 3) which moves under the control of an appropriate cam on the shaft 31. The yoke 37 as shown in Figures 5 and 6 has securely mounted thereon to receive the lower ends of the needles 10 and 10ᵇ a pair of housings 60 which are provided with exterior cylindrical walls 61. The elongated sleeves 62 having the outwardly projecting lugs 63 to engage the wire terminals 38 and 38ᵇ are mounted to rotate about the walls 61. Each of the sleeves 62 has an interiorly projecting flange 63' to support the pins 64 which engage one end of the centering arms 8, as shown in Figure 6. The arms 8 are placed below the flange 63' in the housing 60 and surround the needles 10 and 10ᵇ. These arms 8 have their opposite end portions pivotally mounted to the housing 60 by pins 65. It will be readily seen the rotation of the sleeve with the flange 63' through the pins 64 will control the swinging movement of the arms 8 about the pivot pins 65 fixed to the housings 60. When the ampules are in position the yoke 37 descends to bring the automatic centering arms 8 below the level indicated by the reference letter B in Figure 7. Immediately after this, said centering arms 8 are closed through the agency of Bowden wires or the like 38, 38ᵇ operated in turn by a cam actuated lever associated with the cam shaft 31. The closure of the arms 8 brings the upper part of the ampul necks into register or line with the vertical axis of the hollow filling needles 10, 10ᵇ.

At this moment the support 9 carrying the filling needles and operable through a link 43 and a lever actuated from the cam shaft 31 descends so that the filling needles 10 and 10ᵇ enter the interior of the abbreviated necks of the ampules and the filling of said ampules can be completed in the manner hereinafter explained. The link 43 is made extensible in order that the needles shall not be broken should they encounter any obstacle or resistance in their downward movement. The link 43, shown most clearly in Figure 16, comprises the outer tubular casing 100 in which the stem 101 is free to move under tension of the coil spring 102. The lower end of the casing 100 is pivoted at 104 to the lever 37' to move therewith, and likewise the upper end of the stem 101 is pivoted at 103 to move vertically with the plate carried by the rods 40 and 40ᵇ. Thus said link 43 may be made telescopic and include a spring connection between the parts thereof.

The plunger of the syringe 11, which is also actuated from the cam-shaft 31 draws in liquid from the vessel 14 through the fine tube 12 during the first phase of its action. When the suction stroke is terminated, the arm 16 exerts a pressure on the tube 12 and cuts off the suction, while the arm 15 which has up till then exerted a pressure on the tube 13 communicating with the filling needles is raised so as to allow free passage of the liquid. The plunger then commences the compression or delivery stroke discharging the liquid through the two filling needles; in this manner the liquid is caused to enter the ampules, the quantity entering being regulable not only by varying the stroke of the syringe plunger but also by adjusting the movement of the two arms 15, 16, controlling the opening and closing of the connecting tubes 12, 13, that is controlling the suction and delivery periods. The tube 13 supplying the needles is not closed by the lever arm 15 until the plunger has commenced its suction stroke so that the quantity of liquid left in the needle passages at the end of the delivery stroke is drawn back into the syringe. The delivery tube 13 is then closed and the suction tube 12 for filling the syringe is opened to enable the latter to be charged for the next following cycle of operations.

This action of drawing back excess liquid is of material importance insofar as it prevents any drops remaining, held by capillary attraction, in the hollow filling needles, so that said needles, when they return to their starting position, do not wet the necks of the ampules in any way and said ampules, which are then filled with the dose or measured quantity of liquid, present perfectly dry throats.

When the back-suction described has taken place the needle carrier 9 returns to its initial position whereupon the two automatic centering devices open under the influence of a return spring 38ᵃ and the yoke 37 moves up just high enough to allow the free passage of the ampul holders and filled ampules.

If then the ring carrying the ampul holders continues its own rotary intermittent motion in the manner described, the ampules next arrive at the sealing station at which automatic centering means are again provided (Figure 3). The cam actuated levers 19 and 19ᵇ, which during the rotation of the ring 1 are in a swung back position to allow the ampul necks to pass freely, close again and in closing bring the upper parts of the ampul necks into the correct position in relation to sealing off flames. Each flame, for instance, the fine pointed flame of a blow lamp, is so regulated as to fuse up the tip of the ampul neck during the pause of the ampules at this station. In this operation of fusing up or closing the ampul necks, it is of great importance to be able to ensure that the ampul opening always lies at the same point in relation to the fine pointed flame even if an ampul of irregular shape has to be handled.

When the sealing or closure is complete the automatic centering levers 19, 19ᵇ swing back and leave the ampul necks free to pass when the ring 1 makes its next movement.

At the next station the ampul holders and ampules come within the reach of the ejector lever 21 which is also controlled from the cam shaft 31. This lever descends and its end displaces the ampules downwardly out of their ampul holders. Freed therefrom they roll into a collecting vessel through a suitable funnel or chute 39. The ampul supports or holders are thus left unoccupied ready to receive empty ampules which are to undergo the cycle of operations just described.

As already stated the ampul holders illustrated are constructed to contain two ampules so that the phases or working steps described can be performed upon pairs of ampules at the same time. Naturally, however, the same methods may be applied to a larger number of ampules, either by providing the rotary ampul supports with a larger number of places or by varying the intervals moved through by the ring or by modifying the operating parts of the machine so that the various steps are performed, not on two, but on a larger number of ampules at a time.

When the machine is running empty, that is either when it is without ampules or during the time which it takes for the first ampules to arrive under the filling device, it is essential that the filling needles should not eject the liquid drawn in by the syringe. To prevent this the double lever device 17 is set by the cam 18 to obstruct closure of the suction tube 12 by holding up the arm 16 whilst it itself closes the delivery tube 13 continuously. In this manner liquid drawn in to the syringe returns by said suction pipe 12 to the vessel 14 while the working steps nevertheless take place in their normal order, the device 17 having been released, when the ampules arrive under the filling device.

It is obvious that alterations may be made in the construction and shape of the various parts, in the choice of materials for and design of the cutting devices and so forth and also in the arrangement of the ampul supports on the carrier ring without departing from the scope of the present invention.

I claim:—

1. In an automatic ampul filling machine comprising ampul trimming, filling, sealing and delivery stations in series, a travelling ampul holder and feed means operative for advancing said holder from station to station, the combination with the feed means of ampul inverting mechanism disposed between the trimming and filling station.

2. Automatic ampul filling machine, comprising a series of stations, a travelling ampul holder, feed means for advancing said ampul holder from station to station of the machine, a scoring device operative to weaken the ampul neck at a point at which excess length thereof is to be detached, means for inverting the ampul, a striker for detaching said excess neck length from the ampul in an inverted position, dosing and filling devices and sealing apparatus for closing the ampul.

3. Automatic ampul filling machine, comprising a travelling ampul holder a mounting for said holder allowing rotation about a horizontal axis, guide means operative upon said holder to adjust the ampul about said axis to an inverted position, scoring and striking devices for detaching excess length of neck from the ampul in an inverted position, dosing and filling means and sealing apparatus for closing the ampul.

4. Automatic ampul filling machine comprising a travelling ampul holder consisting of a plurality of elastic gripping members and a horizontal pivotal mounting, guide means operative upon said holder to adjust the ampul about said axis to an inverted position, scoring and striking devices for detaching excess length of neck from the ampul in an inverted position, dosing and filling means and sealing apparatus for closing the ampul.

5. Automatic ampul filling machine comprising a travelling ampul carrier, severing means for detaching the excess length of neck, a plunger operated filling pump, valve gear and connections for said pump and sealing off apparatus for closing the ampul after filling, said valve gear consisting of flexible suction and delivery conduits, constricting members operative upon said flexible conduits, cam control means and connecting rods between said constricting members and said cam control means.

6. Automatic ampul filling machine comprising a travelling ampul carrier, severing devices for removing excess length of ampul neck, dosing and filling means, filling nozzles connected thereto, a reciprocating support for introducing said nozzles into said ampules, operating gear for said support including an elastic safety element and sealing off apparatus substantially as and for the purpose set forth.

7. In an automatic ampul filling machine comprising a swinging and travelling ampul carrier to hold the ampules in vertical position, a trimming disc operative to weaken the neck of the ampul at a point which the excess length is to be detached, a fixed cam for engaging the ampul carrier whereby the ampul is swung into inverted position, a striker for engaging the ampul while in the inverted position to remove the neck, dosing and filling means for introducing a measured quantity of material into the ampul, the said ampul adapted to be held vertically on the ampul carrier in fixed position during this operation, filling means normally held spaced from said ampul, means for lowering said filling means whereby to register with said ampul to fill the same, and sealing apparatus for closing the ampul.

LUIGI MARZOCCHI.